US011262009B2

(12) United States Patent
Tiberghien et al.

(10) Patent No.: US 11,262,009 B2
(45) Date of Patent: Mar. 1, 2022

(54) FEMALE COUPLING ELEMENT AND FLUID COUPLING COMPRISING A MALE COUPLING ELEMENT AND SAID FEMALE COUPLING ELEMENT

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 181 days.

(21) Appl. No.: 16/715,344

(22) Filed: Dec. 16, 2019

(65) Prior Publication Data
US 2020/0200310 A1 Jun. 25, 2020

(30) Foreign Application Priority Data

Dec. 21, 2018 (FR) ...................................... 1873884

(51) Int. Cl.
*F16L 37/084* (2006.01)
(52) U.S. Cl.
CPC ................. *F16L 37/0841* (2013.01)
(58) Field of Classification Search
CPC .............................. F16L 37/0841; F16L 37/23
See application file for complete search history.

(56) References Cited

U.S. PATENT DOCUMENTS 4,311,328 A * 1/1982 Truchet ................... F16L 37/22
285/308

FOREIGN PATENT DOCUMENTS

| EP | 0375581 A1 | 6/1990 | |
| EP | 1422461 A1 | 5/2004 | |
| EP | 1916464 A1 | 4/2008 | |
| FR | 1487324 | 1/1966 | |
| FR | 2865259 A1 * | 7/2005 | ............. F16L 37/42 |

OTHER PUBLICATIONS

Europe Search Report dated Apr. 23, 2020, for EP patent application 19218661, 2 pages.
France Search Report dated Oct. 11, 2019, for FR patent application 1873884, 2 pages.

* cited by examiner

*Primary Examiner* — David Bochna

(57) ABSTRACT

A fluid female coupling element (11), comprising a female body (21), able to receive a male coupling element (2), a bolt (41), mounted sliding transversely between a holding position and a releasing position of the male coupling element and a plunger (51), movable between forward and rear positions. To automatically oppose the removal of the male element fitted within it, even if the male element has a reduced length, the female coupling element (11) comprises a memory ring (61), movable between an advanced position for holding the bolt (41) in the releasing position and a withdrawn position allowing the movement of the bolt (41) toward its holding position, the plunger (51) driving the memory ring (61) toward the withdrawn position when the plunger moves toward the rear position and the memory ring being in the advanced position in the uncoupled position.

15 Claims, 17 Drawing Sheets

FEMALE COUPLING ELEMENT AND FLUID COUPLING COMPRISING A MALE COUPLING ELEMENT AND SAID FEMALE COUPLING ELEMENT

CROSS-REFERENCE TO RELATED APPLICATIONS

The present application claims priority to French patent application no. 1873884, filed on Dec. 21, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a female fluid coupling element, as well as a fluid coupling comprising a male coupling element as well as said female coupling element.

The invention relates to the field of fluid couplings, in particular for filling reservoirs with coolant, for example up to 20 bars.

Description of Related Art

EP 1,916,464 A1 describes a female coupling element, able to receive a smooth tubular male element by fitting. The female element comprises a sealing gasket housed inside a body of the female element and able to cooperate tightly with a peripheral surface of the male element. The female element further comprises an interface member, housed inside the body of the female element. The interface member is translated parallel to the fitting axis under the action of the male element, during fitting in the female element, from a first position, in which the interface member is inserted radially between the sealing gasket and the peripheral surface of the male element, toward a second position, in which the interface member is axially offset relative to the sealing gasket, the sealing gasket resting tightly on the peripheral surface of the male element.

The interface member thus prevents the damage of the sealing gasket during the fitting of the male element, in particular if the male element has protruding irregularities in its peripheral surface.

For this known female element, the locking of the male element is provided by balls housed in a moving locking ring, the balls jamming the peripheral surface of the male element. The balls are thus maintained by a surface provided at a mouth of the body. For this known female element, the locking of the male element is automatic, since, upon coupling, the end of the male element first pushes the balls and the locking ring back toward the rear relative to the body of the female element, up to a certain position where a spring pushes the locking ring back in the opposite direction, so as to lock the male element in the female element.

However, the cumulative presence of the interface member and the locking ring causes the female element to have a significant longitudinal bulk. This bulk causes a significant length of the tubular male element to be introduced into the female element to perform the coupling.

FR 1,487,324 A describes a female coupling element, able to lock a male coupling element including a collar with a frustoconical profile. To that end, this female element comprises a bolt, comprising a tooth designed to engage with the collar in the holding position of the bolt. The locking of the male element in the female element is automatic by engagement of the frustoconical profile with this same tooth, which moves the bolt from its holding position to its releasing position in which the bolt frees the passage for the male coupling element in the female element. In a variant, the bolt is kept in the holding position of the male element by a transverse stud, which the user must push back to allow the locking and unlocking of the male element.

BRIEF SUMMARY OF THE INVENTION

However, this known female coupling element requires a frustoconical surface on the bolt tooth for the automatic coupling, which requires that a significant length of the male element be introduced into the female element to perform the coupling.

One aim of the invention is therefore to address the drawbacks of the prior art, by proposing a new female fluid coupling element that automatically opposes the removal of a male element fitted within it, even if the male element has a reduced length, in particular even if the outer radial surface of the part of the male element fitted in the female element has a longitudinally constant diameter.

The invention relates to a female fluid coupling element, the female coupling element being designed to adopt a coupled configuration and an uncoupled configuration and comprising:

a female body, arranging an inner channel able to receive a male coupling element by fitting along the longitudinal axis of the female coupling element;

a main sealing gasket, able to cooperate radially with the male coupling element in the coupled configuration;

a bolt, pierced with an opening designed to be passed through by the male coupling element, the bolt being mounted sliding in a bolt housing emerging from the female body, radially with respect to the longitudinal axis, between a holding position, in which the bolt cooperates with an outer radial surface of the male element and opposes the removal of the male coupling element from the female body, and a releasing position, in which the bolt allows the movement of the male coupling element in the female body; in the coupled configuration, the bolt is in the holding position; and resilient means returning the bolt toward its holding position, and a plunger, movable in the inner channel of the female body along the longitudinal axis between a forward position and a rear position.

According to the invention, the female coupling element comprises:

a memory ring, secured to the female body radially with respect to the longitudinal axis and movable along the longitudinal axis in the female body, between:
  an advanced position, in which the memory ring cooperates with the bolt, radially with respect to the longitudinal axis, and thus keeps the bolt in the releasing position, and
  a withdrawn position, in which the memory ring allows the movement of the bolt toward its holding position, the plunger being able to drive the memory ring to the withdrawn position when the plunger moves from the forward position to the rear position; and
a first spring that returns the memory ring toward its advanced position. In the uncoupled configuration, the memory ring is in the advanced position.

Owing to the invention, the female element automatically ensures locking opposing the removal of the male element, when this male element is fitted in the inner channel. To that end, in the uncoupled configuration of the female element, the fitting movement of the male element pushes the plunger and thus leads the plunger to drive the memory ring to its withdrawn position. The memory ring then allows the bolt to be brought automatically into the holding position by the resilient means. The plunger and the memory ring simply being actuated by being pushed by the male element, the placement in the holding position of the bolt is done even if the male element has a longitudinally constant diameter, that is to say, it does not have a groove, collar or shoulder. In order for the male element to be able to push the plunger, it is for example provided that, during the fitting of the male element, a front end of the male element actuates the plunger.

The invention provides that the bolt is radially movable relative to the longitudinal axis so as to reduce the longitudinal bulk of the female element. The bolt being longitudinally short, it can be advantageously arranged between a front end of the female element and the plunger. Thus, during the fitting in the female element, a male element with a reduced length can still reach and actuate the plunger, so that the memory ring is driven to automatically cause the bolt to enter the holding position.

The expression "the bolt cooperates with an outer radial surface of the male element" means that the bolt is in direct contact with the outer radial surface of the male element. The bolt therefore itself opposes the withdrawal of the male element, with no intermediate part.

Advantageous features of the invention are defined hereinafter:

The bolt and the memory ring comprise respective stop surfaces, which are orthoradial relative to the longitudinal axis, while the stop surface of the memory ring and the stop surface of the bolt: in the advanced position of the memory ring, are in contact to keep the bolt in the releasing position, and in the withdrawn position of the memory ring, are offset relative to one another along the longitudinal axis to allow the movement of the bolt toward its holding position.

The stop surface of the bolt is delimited by the opening of the bolt.

In the holding position of the bolt, the stop surface of the memory ring is opposite a holding surface of the bolt, radially relative to the longitudinal axis.

The bolt comprises two locking surfaces, which delimit portions of the opening and which are suitable for cooperating with the male coupling element in the holding position of the bolt; the two locking surfaces are symmetrical relative to a radial plane with respect to the longitudinal axis; the two locking surfaces are inclined relative to one another and converge opposite the radial mouth of the bolt housing in a section plane orthogonal to the longitudinal axis and passing through the two locking surfaces.

The two locking surfaces are inclined relative to one another and converge toward the rear of the female coupling element in a section plane orthoradial to the longitudinal axis and passing through the two locking surfaces.

The plunger has a possibility of movement relative to the memory ring, along the longitudinal axis.

The memory ring and the plunger are arranged radially on either side of the female body; the female body comprises an elongate housing, which is a radial through housing, two sealing gaskets arranged on either side of the elongate housing, along the longitudinal axis, are radially inserted between the plunger and the female body, the female coupling element comprises at least one transmission element that is arranged in the elongate housing and that is able to cooperate longitudinally with the memory ring and with the plunger, such that the plunger is able to drive the memory ring toward the withdrawn position, by means of the transmission element.

Each transmission element comprises an actuating ball.

The plunger delimits a front spot facing for receiving a front end of the male coupling element; in the forward position and in the uncoupled configuration of the female coupling element, the plunger is inserted radially between the front spot facing and the main sealing gasket; and the plunger is movable along the longitudinal axis relative to the female body, against a second spring of the female coupling element, up to a position in which the plunger is longitudinally offset relative to the main sealing gasket.

The female coupling element comprises a main housing, housing the main sealing gasket; the female body comprises an intermediate body around which the memory ring is mounted; the memory ring forms a front axial wall of the main housing.

A front end of the plunger and a rear axial wall of the main housing define, along the longitudinal axis, in the uncoupled configuration, a first longitudinal distance; and the plunger comprises a contact surface by means of which the plunger, during its movement between the forward position and the rear position, comes into longitudinal contact with the transmission element in order to drive the memory ring toward the withdrawn position, the transmission element abutting rearwardly against the memory ring and the contact surface defining between them, in the uncoupled configuration, a second longitudinal distance, defined along the longitudinal axis, the second longitudinal distance being greater than or equal to the first longitudinal distance.

In the uncoupled configuration, the main sealing gasket is longitudinally offset relative to the intermediate body; and in the coupled configuration, an inner radial covering surface of the intermediate body radially covers the main sealing gasket.

The female coupling element further comprises an adjusting ring housed in the intermediate body and forming a rear axial wall of the main housing of the main sealing gasket in the female element, the adjusting ring being movable relative to the intermediate body along the longitudinal axis and being pushed back by a third spring toward the main sealing gasket.

A third longitudinal distance, measured along the longitudinal axis, is defined in the uncoupled configuration between the front axial wall and a front end of the inner radial covering surface; in the uncoupled configuration and in the advanced position of the memory ring, the stop surfaces cooperate over a fourth longitudinal distance, defined along the longitudinal axis; and the third longitudinal distance is less than or equal to the fourth longitudinal distance.

The memory ring comprises an indexing tongue, which is engaged in a longitudinal indexing slot of the bolt, to connect the memory ring and the bolt in rotation around the longitudinal axis.

The invention also relates to a fluid coupling, comprising a male coupling element, as well as the female coupling element as defined above, the male coupling element being able to abut longitudinally against the plunger and to push the plunger back from its forward position to its rear position, the bolt cooperating, in the holding position, with the outer radial surface of the male coupling element to oppose the removal of the male coupling element from the female body, the outer radial surface of the male coupling element having a longitudinally constant diameter over its entire longitudinal part fitted in the female coupling element in the coupled configuration.

BRIEF DESCRIPTION OF THE SEVERAL VIEWS OF THE DRAWINGS

Other features of the invention will emerge in more detail from the following description, presenting preferential but non-limiting embodiments of the invention, this description referring to the appended drawings listed below.

DETAILED DESCRIPTION OF THE INVENTION

Figure 1:
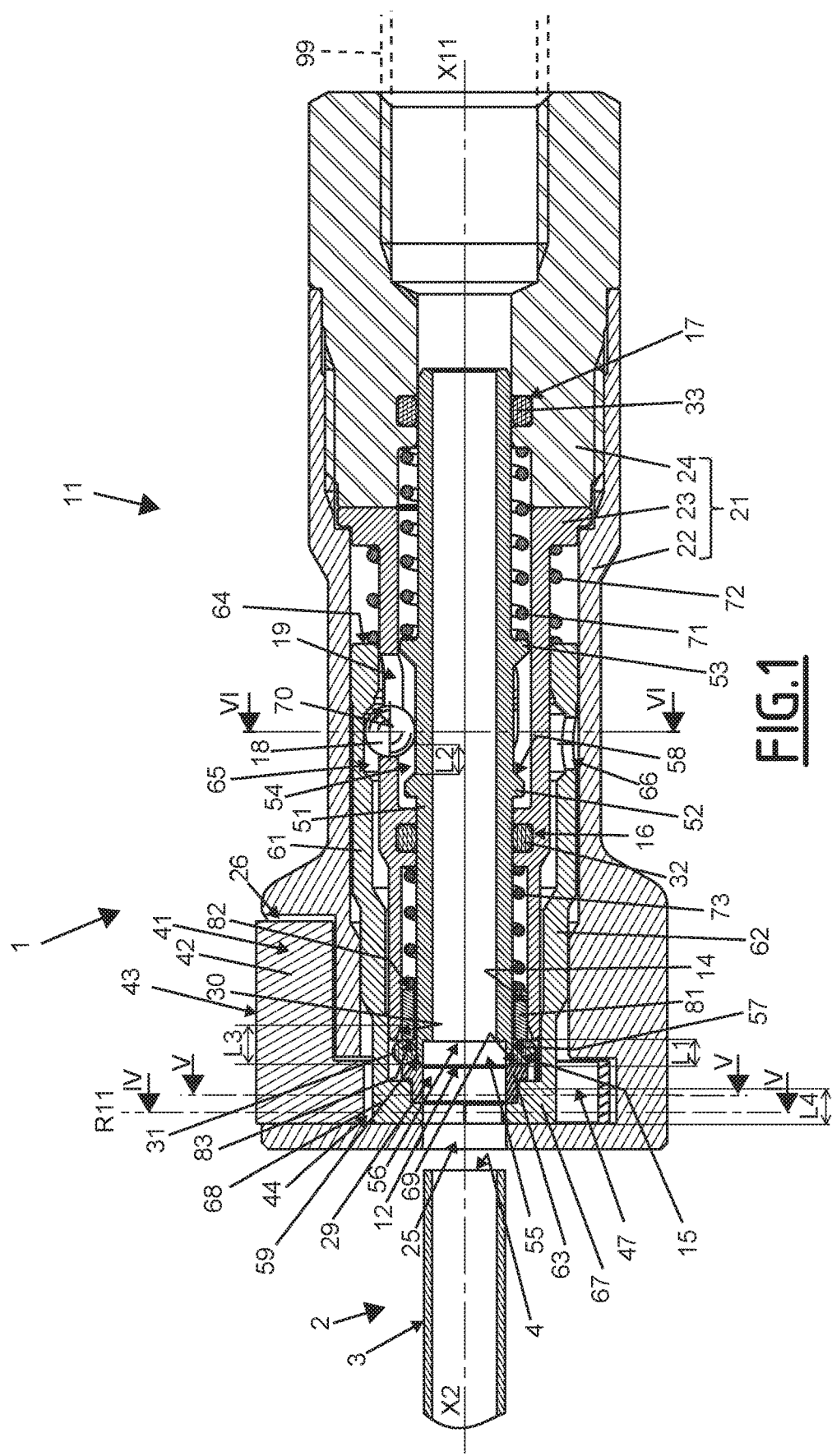
FIGS. 1, 2 and 3 are longitudinal sectional views, along a same section line, of a fluid coupling according to a first embodiment according to the invention, the fluid coupling being shown in three different configurations.

In the first embodiment illustrated in FIGS. 1 to 12, a fluid coupling 1 comprises a female fluid coupling element 11 and a male fluid coupling element 2. For example, the male coupling element 2 is a brass or copper tube.

Unless otherwise explicitly stated, in the present document, expressions such as "radial", "axial", "longitudinal", "transverse", when they relate to the female coupling element 11, relate to a longitudinal axis X11 defined by the female coupling element 11. Likewise, the term "front", when it relates to the female coupling element 11, designates a longitudinal direction toward the left in FIG. 1, whereas the term "rear" designates an opposite direction. The term "inner", when it relates to the female coupling element 11, means "facing the longitudinal axis X11", while the term "outer" means "facing away from the longitudinal axis X11".

Unless otherwise explicitly stated, expressions such as "radial", "axial", "longitudinal", "transverse", when they relate to the male coupling element 2, relate to a longitudinal axis X2 defined by the male coupling element 2. Likewise, the term "front", when it relates to the female coupling element 2, designates a longitudinal direction toward the right in FIG. 1, whereas the term "rear" designates an opposite direction. The term "inner", when it relates to the male coupling element 2, means "facing the longitudinal axis X2", while the term "outer" means "facing away from the longitudinal axis X2".

The male coupling element 2 comprises a front end 4. The male coupling element 2 is preferably tubular, that is to say, it comprises an outer radial surface 3 with a longitudinally constant diameter along the axis X2, at least for a longitudinal part of the male coupling element 2 extending from its front end 4 and suitable for being fitted in the female coupling element 11. The male coupling element also comprises an inner channel. The tubular shape of the male coupling element 2 is advantageously coaxial with the axis X2. For example, the male coupling element 2 is a copper or brass tube with a circular cross-section. Preferably, the inner channel of the male coupling element 2 is fluidly coupled, at its rear end, to a pressurized fluid reservoir, for example at 20 bars, for example a coolant. The male coupling element 2 forms an inlet of the reservoir and serves to fill the reservoir with this pressurized fluid, coming from the female coupling element 11. Once the filling is done, the male coupling element 2 is crushed and welded and the front end 4 is cut.

The female coupling element 11 comprises a female body 21, preferably comprising a front body 22, a rear body 24 and an intermediate body 23, which are tubular and coaxial with the longitudinal axis X11. The front body 22 and the rear body 24 are securely fastened to one another.

The rear body 24 is designed to be connected to a channel 99, shown in broken lines in FIG. 1, also coaxial with the longitudinal axis X11. The female body 21 delimits an inner channel 29 in communication with the channel 99. The front body 22, the intermediate body 23 and the rear body 24 each delimit, along the longitudinal axis X11, a successive part of the inner channel 29.

The front body 22 comprises a mouth 25, which extends axially at a front end of the front body 22. The inner channel 29 is configured to receive the male coupling element 2 by fitting within it. In other words, the male coupling element 2 can be introduced into the inner channel 29, by means of the front end 4, introduced into the female body 21 via the mouth 25. Once the fitting is done, the female coupling element 11 is configured so that the longitudinal axes X2 and X11 of the fluid coupling 1 are coaxial.

The front body 22 comprises a bolt housing 26, which extends radially with respect to the longitudinal axis X11 and which emerges on an outer radial surface of the front body 22, in a radial direction relative to the longitudinal axis X11 and which is blind in the opposite radial direction.

The intermediate body 23 comprises, at its front end, a beveled inclined inner surface 30, which diverges in the forward direction. For example, the inclined inner surface 30 has a conical shape centered on the longitudinal axis X11. Toward the rear from the inclined inner surface 30, the intermediate body 23 forms an inner radial covering surface 14, with a constant diameter along the longitudinal axis X11.

The female coupling element 11 comprises a bolt 41 received in the bolt housing 26. The bolt 41 is able to lock the male coupling element 2, in particular if the male element is a copper or brass tube. The bolt 41 is mounted sliding in the front body 22, transversely relative to the longitudinal axis X11, in particular radially relative to the longitudinal axis X11, between a holding position of the male coupling element 2 in the female body 21, shown in FIGS. 3, 7 and 8, and a releasing position, shown in FIGS. 1, 2, 4 and 5, in which the bolt 41 does not oppose the removal of the male coupling element 2 from the female body 21 or the insertion of the male coupling element 2 into the female body 21. In the releasing position, the bolt 41 is preferably pushed further into the female body 21 than in the holding position. In particular, in the releasing position, the bolt 41 allows the movement of the male coupling element 2 in the female body 21, at least longitudinally. A radial axis R11 is defined, which is radial relative to the longitudinal axis X11. In the present example, the bolt 41 is movable along the radial axis R11 with respect to the female body 21.

Figure 12:
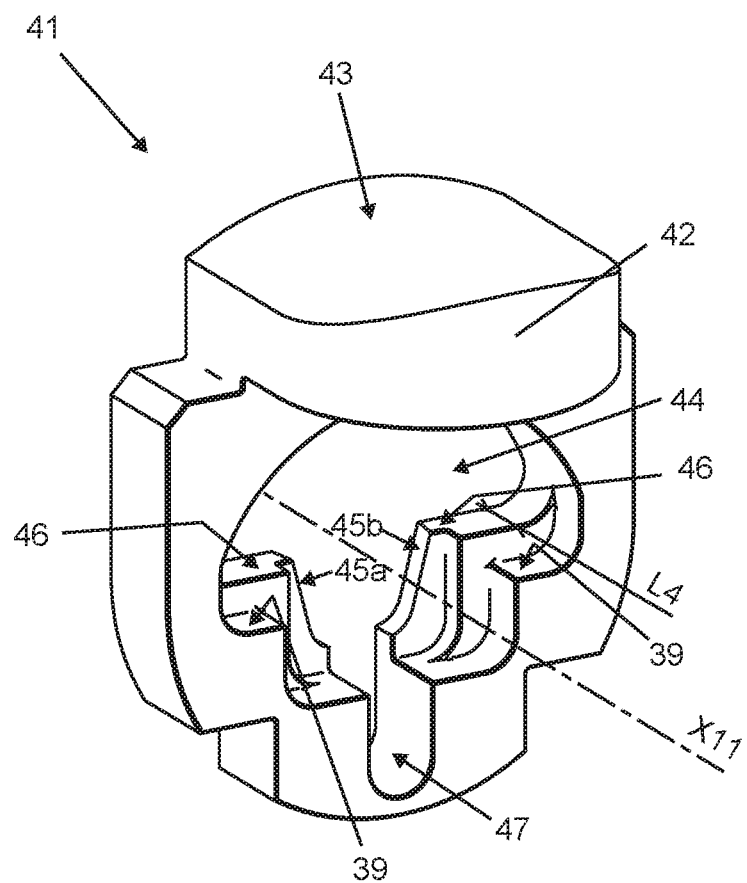
FIG. 12 is a perspective view of a bolt belonging to the female element of FIG. 10, FIGS. 13 and 14 are longitudinal sectional views, in a same section plane, of a fluid coupling according to a second embodiment according to the invention, the fluid coupling being shown in two different configurations.

The bolt 41, shown alone in FIG. 12, comprises an actuating part 42, with an outer face 43, on which an operator can act. The outer face 43 is therefore accessible from outside the female body 21, in particular from outside the bolt housing 26 with the actuating part 42 arranged at the radial mouth of the bolt housing 26. In the holding position, the outer face 43 of the bolt 41 is further from the longitudinal axis X11 than in the releasing position.

The bolt 41 also comprises an opening 44, which passes longitudinally through the bolt 41 and which is suitable for receiving the male coupling element 2. The male coupling element 2 then passes through the bolt 41 via the opening 44. This opening 44 delimits two locking surfaces 45a and 45b. Preferably, the locking surfaces 45a, 45b each delimit only a portion of the opening 44 around the axis X11.

The two locking surfaces 45a and 45b are arranged on either side of the axis X11, preferably symmetrically relative to a radial plane containing the radial axis R11, for example the section plane of FIG. 1. The two locking surfaces 45a and 45b are preferably planar surfaces.

In section in a plane orthoradial to the longitudinal axis X11 passing through the locking surfaces 45a and 45b, that is to say, a plane parallel to the longitudinal axis X11 and orthogonal to the radial axis R1, the two locking surfaces 45a and 45b are inclined relative to one another, together forming a V-shaped passage, that is to say, a flared notch, wider on the front of the side of the mouth 25 than on the rear side of the female coupling element 11. This plane orthoradial to the longitudinal axis X11 is for example the plane of FIG. 9. In other words, in projection in this plane orthoradial to the longitudinal axis X11, the locking surfaces 45a and 45b advantageously converge toward the rear of the female coupling element 11. In section in this plane orthoradial to the longitudinal axis X11, the locking surfaces 45a and 45b preferably form an angle α of 18° (degrees), where each locking surface 45a, 45b forms an angle of 9° relative to a longitudinal direction X11' parallel to the longitudinal axis X11.

Figure 4:
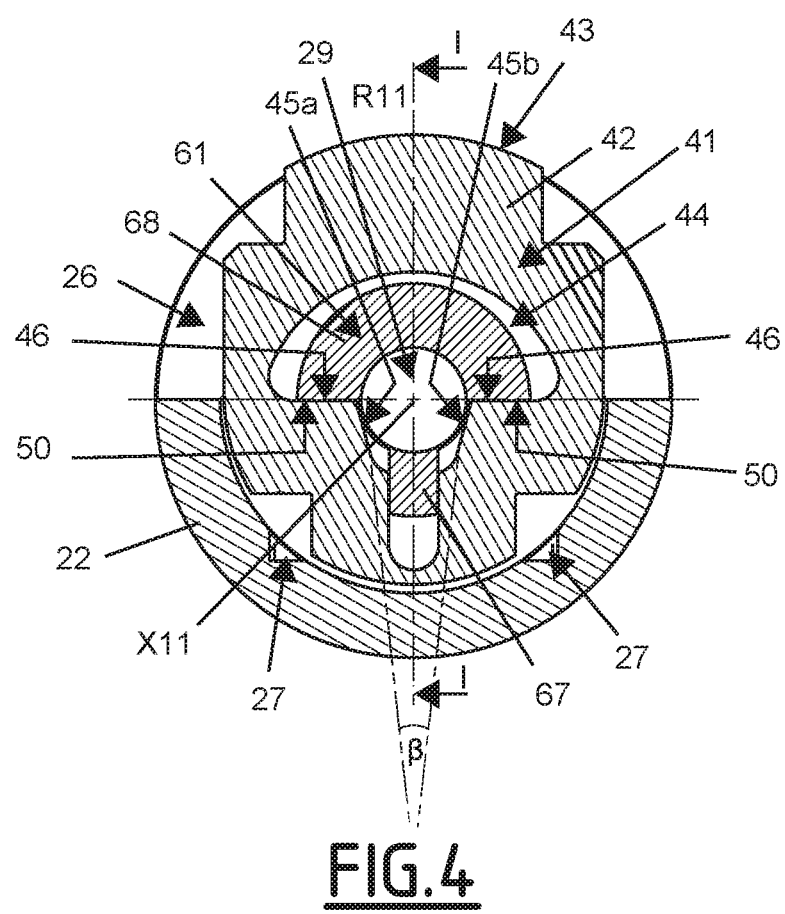
FIGS. 4, 5 and 6 are cross-sections of FIG. 1 along section lines IV-IV, V-V and VI-VI, FIG. 4 showing a section line I-I along which the section of FIGS. 1, 2 and 3 was done.

In section in a plane orthogonal to the longitudinal axis X11 passing through the two locking surfaces 45a and 45b, for example the plane of FIG. 4, the two locking surfaces 45a and 45b are inclined relative to one another. In section in this orthogonal plane, the locking surfaces 45a and 45b are arranged on either side of the radial axis R11. Projected in this orthogonal plane, the passage of the opening 44 formed by the locking surfaces 45a, 45b is also V-shaped, that is to say, the passage forms a flared notch, the mouth of which, closer to the actuating part 42 than the bottom of the V-shaped passage, is wider than the bottom. In other words, in section in this orthogonal plane, the locking surfaces 45a and 45b converge opposite the actuating part 42 of the radial mouth of the housing 26 in which the actuating part 42 is received. Preferably, in section in this orthogonal plane, the locking surfaces 45a and 45b together form an angle β of 30°, where each locking surface 45a, 45b forms an angle of 15° each relative to the radial axis R11.

The opening 44 also delimits two stop surfaces 46, which are orthoradial to the longitudinal axis X11. In other words, the two stop surfaces 46 are perpendicular to the radial axis R11. The two stop surfaces 46 extend in a same plane parallel to the orthoradial plane of FIG. 9 or in a plane perpendicular to the plane of FIG. 1. The stop surfaces 46 each extend from one of the locking surfaces 45a, 45b, while being symmetrical relative to a plane comprising the radial axis R11 and the longitudinal axis X11. The stop surfaces 46 are oriented toward the actuating part 42 of the bolt 41.

The bolt 41 also delimits two holding surfaces 39, which are orthoradial to the longitudinal axis X11. The holding surfaces 39 extend in a same plane parallel to the orthoradial plane of FIG. 9. The holding surfaces 39 respectively extend behind each of the stop surfaces 46, while being symmetrical relative to the plane comprising the radial axis R11 and the longitudinal axis X11. An axial surface connects each of the stop surfaces 46 and the holding surface 39 that is axially aligned with it. Along the radial axis R11, the holding surface 39 are further from the outer face 43 of the bolt 41 than the stop surfaces 46.

The opening 44 also delimits a longitudinal indexing slot 47, which emerges in the V-shaped passage formed by the locking surfaces 45a and 45b. The longitudinal slot 47 connects the locking surfaces 45a and 45b to one another while being passed through by the plane comprising the radial axis R11 and the longitudinal axis X11.

Figure 5:
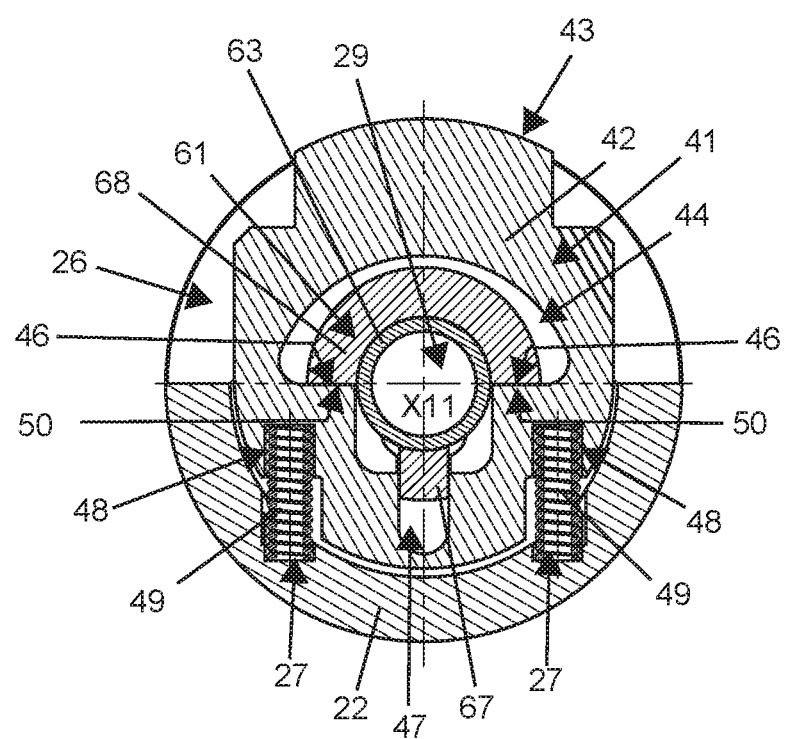

As shown in FIG. 5, the female coupling element 11 comprises two helical compression springs 49, which constitute resilient means that push the bolt 41 back toward its holding position, while bearing on the female body 21. The bolt 41 advantageously comprises two outer transverse housings 48, which extend parallel to the sliding axis of the bolt 41, here the radial axis R11. The front body 22 advantageously comprises two outer transverse housings 27, which extend parallel to the sliding axis of the bolt 41, and are arranged facing the outer transverse housings 48. Each spring 49 is housed, at one transverse end of the spring 49, in one of the outer transverse housings 48 and, at an opposite transverse end of the spring 49, in one of the outer transverse housings 27.

The resilient return means assume the form of the two springs 49; they thus offer a resilient return force compatible with the desired locking force for the male coupling element 2.

Figure 2:
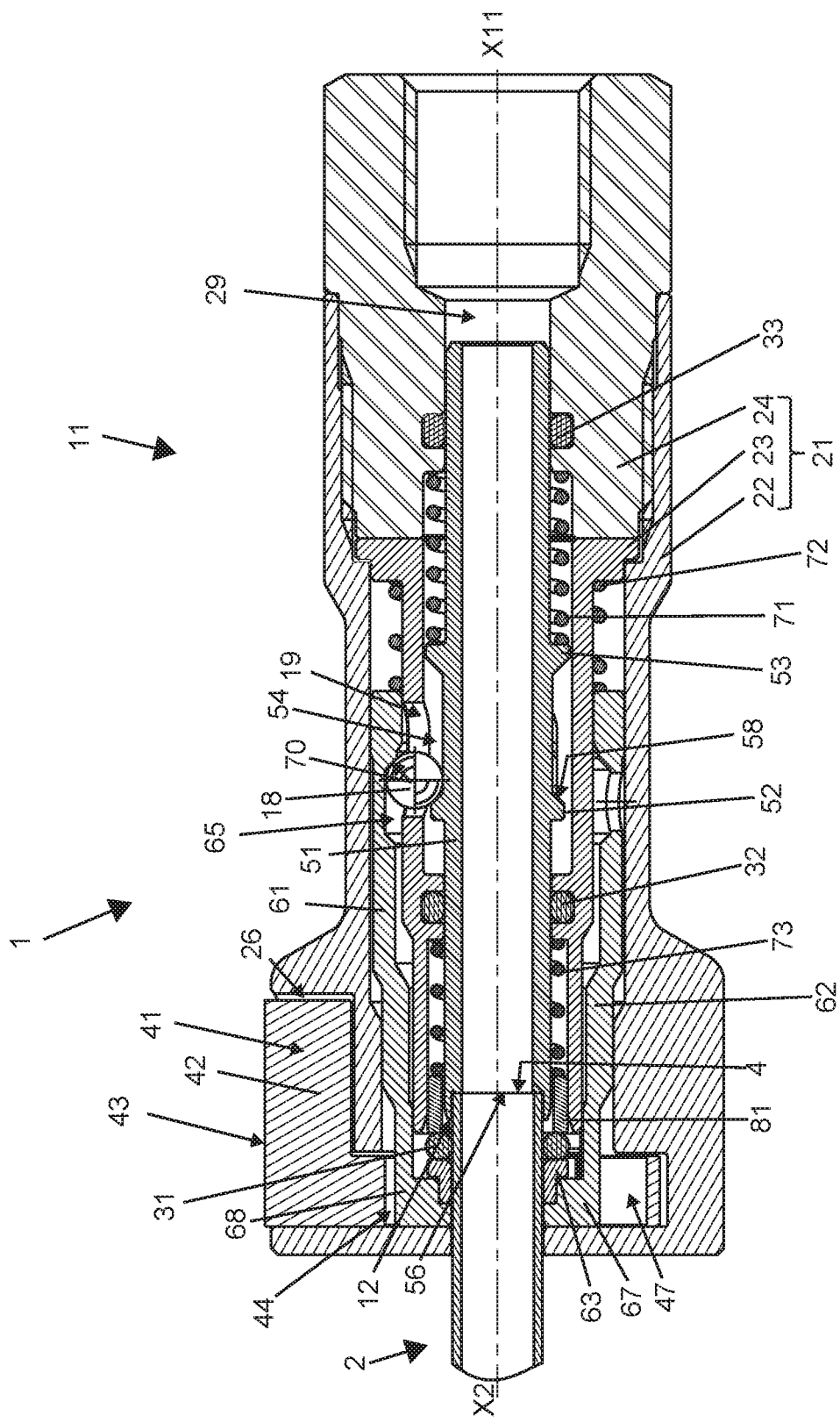
Figure 3:
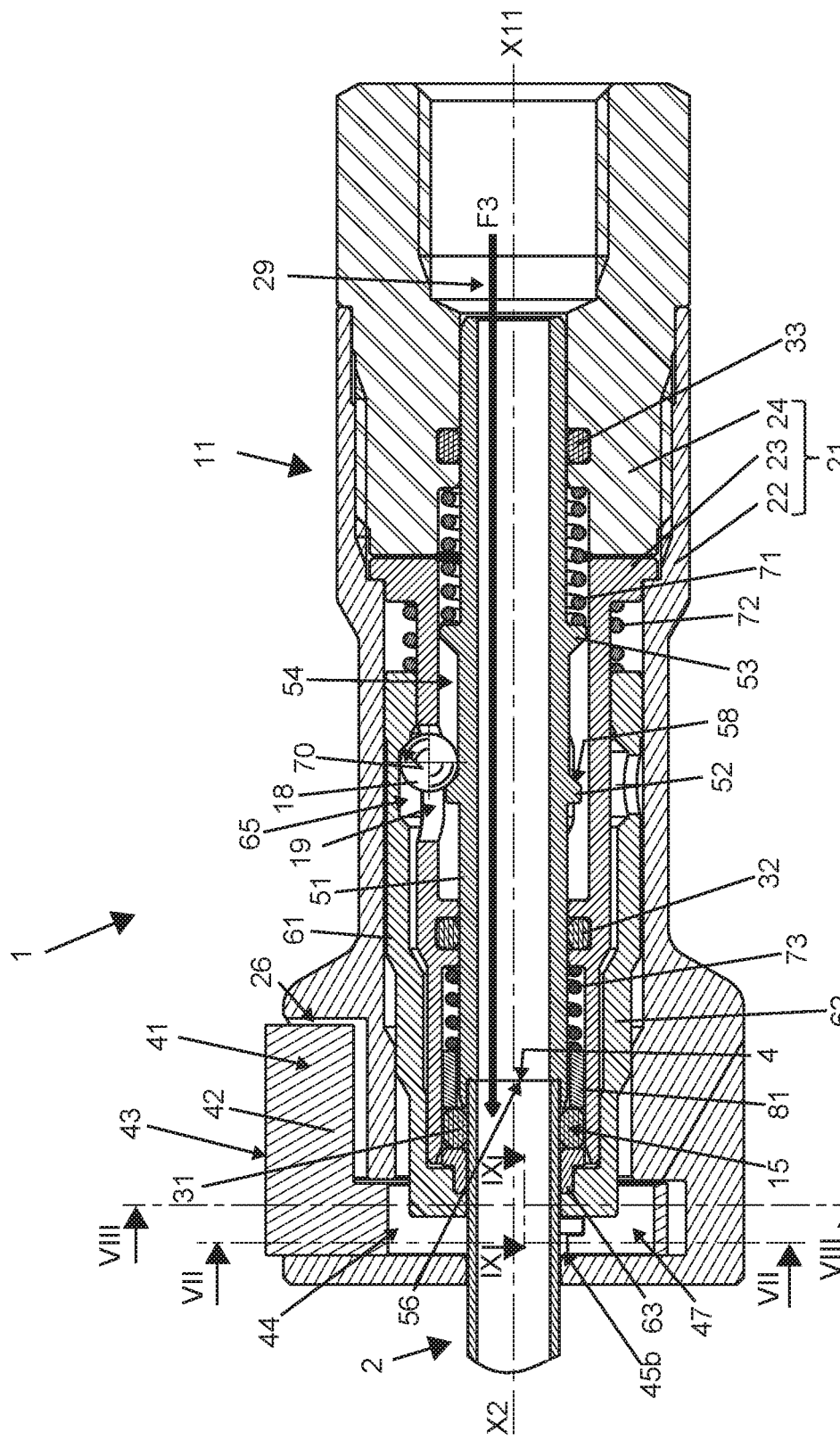

As is particularly visible in FIGS. 1 to 3, the female coupling element 11 comprises a plunger ring 51, which constitutes one preferred example of a plunger. The plunger ring 51 is advantageously generally tubular, coaxial with the longitudinal axis X11. The plunger ring 51 is mounted moving inside the intermediate body 23, in the inner channel 29 of the female body 21. Preferably, the plunger ring 51 slides longitudinally relative to the female body 21 but is radially secured to the female body 21. It is advantageously provided that the intermediate body 23 supports and guides the plunger ring 51 in this sliding, the plunger ring 51 being received inside the intermediate body 23.

Figure 6:
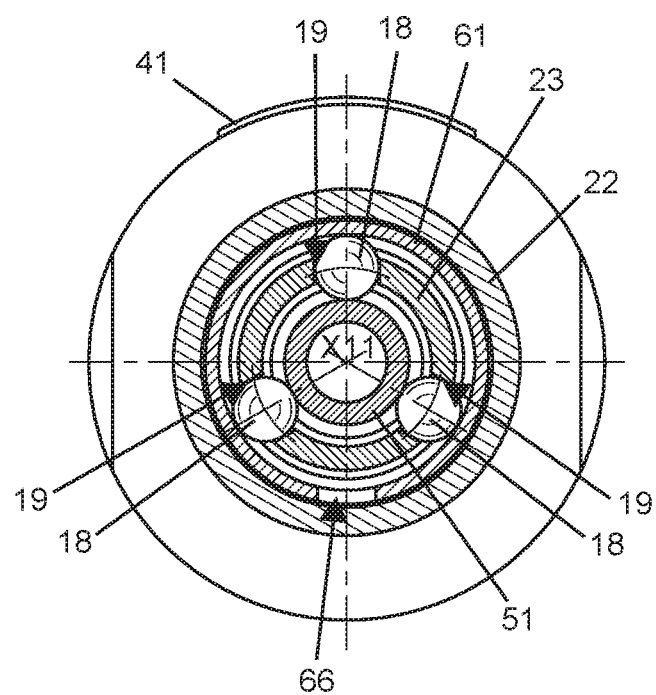

The intermediate body 23 comprises three elongated housings 19, which each run alongside an actuating ball 18. As shown in FIG. 6, three actuating balls 18, housed in three respective elongate housings 19, are advantageously provided. Each elongate housing 19 passes radially through the intermediate body 23. The elongate housings 19 are advantageously evenly distributed around the longitudinal axis X11, while all being arranged at the same longitudinal level on the longitudinal axis X11. "Elongate" means that each elongate housing 19 is elongated in the longitudinal direction. In the orthoradial direction, each elongate housing 19 preferably has a width fitted to the diameter of the actuating ball 18 that this elongate housing 19 receives.

The female coupling element 11 comprises two toroidal auxiliary sealing gaskets 32 and 33, which are housed in two respective inner grooves 16 and 17 of the female body 21. The auxiliary sealing gaskets 32 and 33 as well as the grooves 16 and 17 are advantageously coaxial with the longitudinal axis X11. The auxiliary sealing gasket 32 and the groove 16 are advantageously provided on the intermediate body 23. The auxiliary sealing gasket 33 and the groove 17 are advantageously provided on the rear body 24. The two auxiliary sealing gaskets 32 and 33 are arranged longitudinally on either side of the elongate housings 19, the auxiliary sealing gasket 32 being arranged in the front, while the auxiliary sealing gasket 33 is arranged in the rear. The auxiliary sealing gaskets 32 and 33 are radially inserted between the female body 21 and the plunger 51, so as to ensure the sealing between the female body 21 and the plunger 51. The auxiliary sealing gaskets 32 and 33 are designed to ensure the sealing between the plunger ring 51 and the female body 21 irrespective of the longitudinal position of the plunger ring 51 in the female body 21.

The plunger ring 51 comprises a front collar 52 and a rear collar 53 that delimit, longitudinally between them, a volume 54 for partially receiving actuating balls 18, the volume 54 advantageously being annular. The front collar 52 comprises, in the rear, a contact surface 58 suitable for coming into contact with the actuating balls 18 during a rearward movement of the plunger ring 51, so as to drive the actuating balls 18 toward the rear. The actuating balls 18 therefore cooperate longitudinally with the plunger ring 51. The contact surface 58 delimits the volume 54.

The female coupling element 11 also comprises a spring 71, which is longitudinally inserted between the rear body 24 and the plunger ring 51. The spring 71 pushes the plunger ring 51 longitudinally back toward the mouth 25 of the front body 22, that is to say, toward a forward position of the plunger ring 51 relative to the female body 21. In FIG. 1, the plunger ring 51 is in the forward position. The rear collar 53 advantageously provides axial bearing for the spring 71.

The plunger ring 51 delimits a forward spot facing 55. The front spot facing 55 is longitudinally delimited, toward the rear, by a longitudinal shoulder 56 of the plunger ring 51. The front spot facing 55 emerges, toward the front, outside the plunger ring 51, at a front end 12 of the plunger ring 51.

The female coupling element 11 comprises a memory ring 61. The memory ring 61 is advantageously generally tubular, coaxial with the longitudinal axis X11. The memory ring 61 is mounted radially between the front body 22 and the intermediate body 23, that is to say, the front body 22 surrounds the memory ring 61, while the memory ring 61 surrounds the intermediate body 23. The front body 22 also surrounds the intermediate body 23. Thus, the plunger ring 51 and the memory ring 61 are arranged radially on either side of the intermediate body 23.

The memory ring 61 is mounted with the possibility of longitudinal sliding relative to the female body 21, but is radially secured with the female body 21. This memory ring 61 comprises an outer ring 62 and an annular inner ring 63. The annular inner ring 63 is mounted floating in the outer ring 62. In particular, the annular inner ring 63 can slide longitudinally relative to the outer ring 62, and pivot around the longitudinal axis X11, even if these movements are not necessary to the operation of the female coupling element 11. In a variant, it is possible to provide that the outer ring 62 and the inner annular ring 63 are fixedly secured to one another, for example by gluing.

The female coupling element 11 comprises a spring 72, which, relative to the female body 21, longitudinally pushes the memory ring 61 toward the mouth 25 of the front body 22, in the opening 44 of the bolt 41. To that end, the spring 72 axially bears, parallel to the longitudinal axis X11, on the intermediate body 23 and on the rear face 64 of the outer ring 62 of the memory ring 61.

Preferably, the resilient force exerted by the spring 72 is lower than the resilient force exerted by the spring 71.

The outer ring 62 comprises a peripheral inner groove 65. Preferably, for mounting reasons of the female coupling element 11, the outer ring 62 also comprises a mounting orifice 66, advantageously just one, that emerges in the inner groove 65 and at the outer surface of the outer ring 62. The orifice 66 passes radially through the outer ring 62. The inner groove 65 delimits a partial receiving volume for the actuating balls 18. The diameter of the orifice 66 is slightly larger than the diameter of each actuating ball 18.

The actuating balls 18 are suitable for coming into contact with a contact surface 70 of the inner groove 65, behind said inner groove 65. The actuating balls 18 therefore longitudinally cooperate with the memory ring 61.

The contact surfaces 58 and 70 have substantially the same incline relative to the longitudinal axis X11, preferably an oblique incline relative to the longitudinal axis X11.

As is better visible in FIGS. 4, 5, 7, 8 and 11, the outer ring 62 of the memory ring 61 comprises an indexing tongue 67 and a half-crown 68 that extend toward the front of the outer ring 62. Here, the indexing tongue 67 and the half-crown 68 are at the front end of the memory ring 61. The annular inner ring 63 cooperates longitudinally with the outer ring 62 at the indexing tongue 67 and at the half-crown 68, either while floating, or while being fixedly secured.

Figure 9:
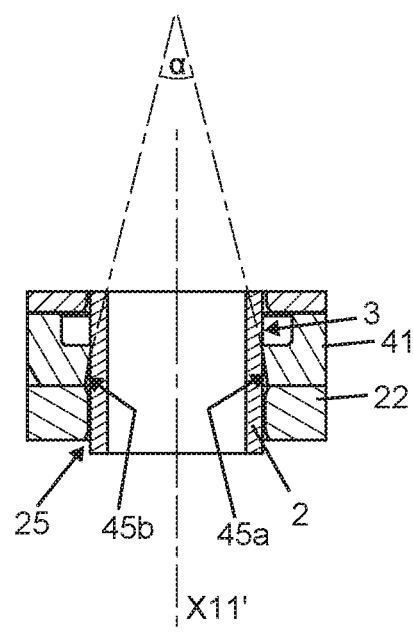
FIG. 9 is a longitudinal sectional view of FIG. 3 along section line IX-IX.
Figure 10:
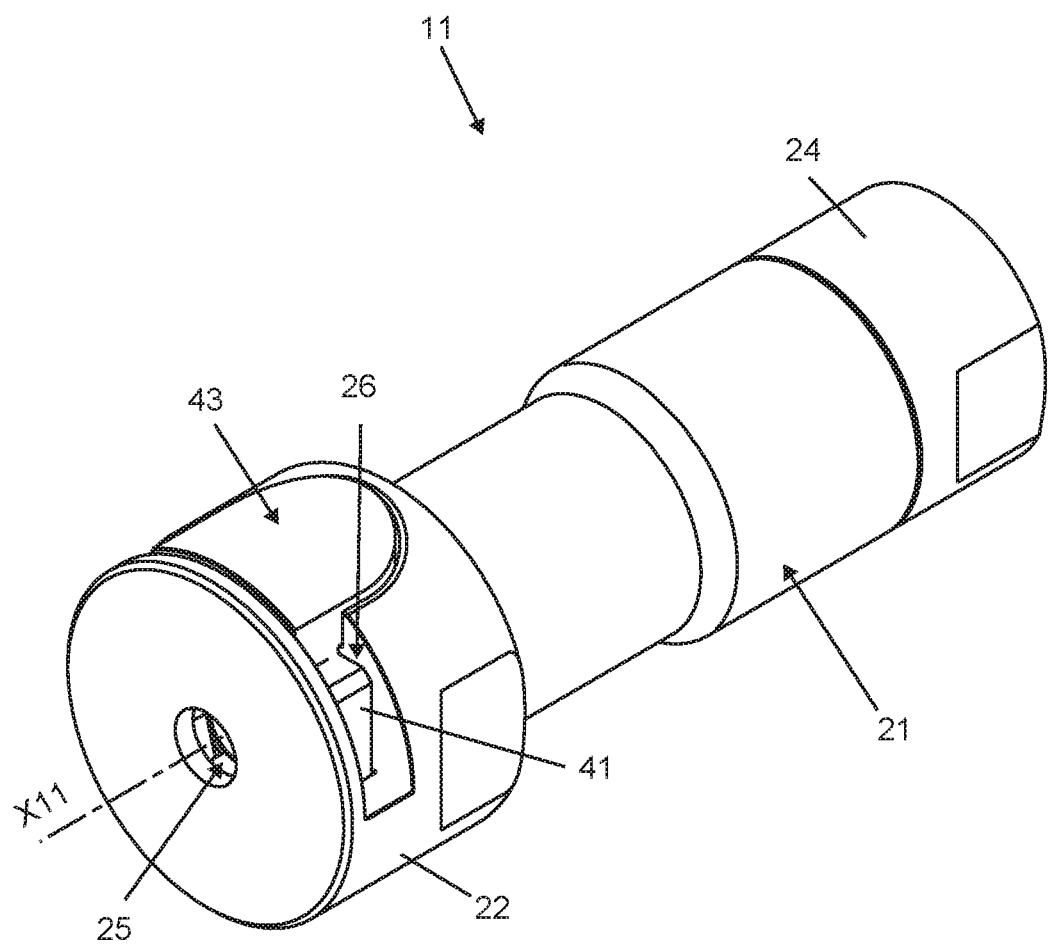
FIG. 10 is a perspective view of a female element belonging to the fluid coupling of the preceding figures.
Figure 11:
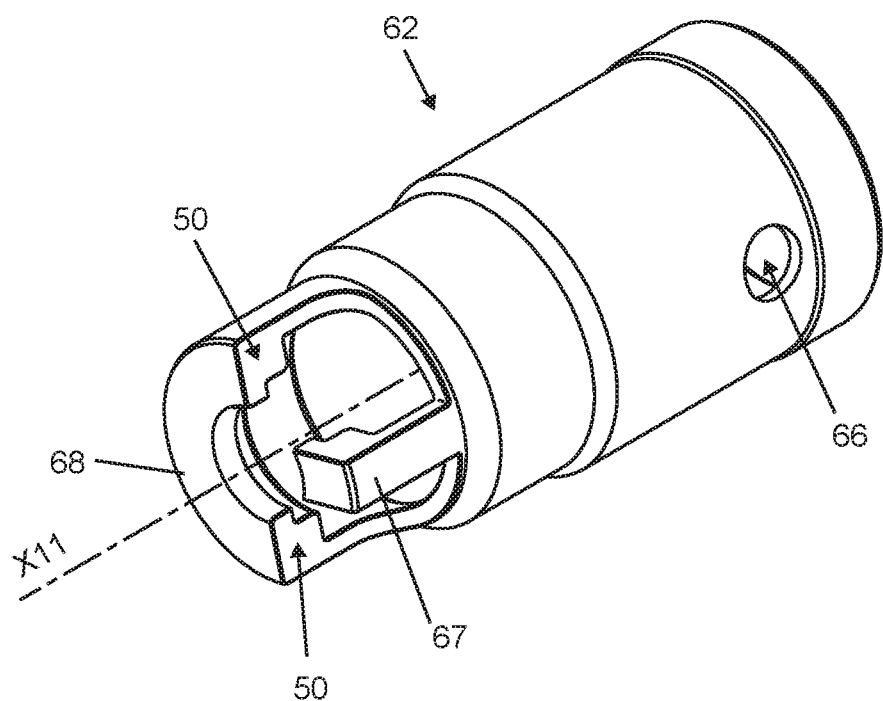
FIG. 11 is a perspective view of part of a memory belonging to the female element of FIG. 10.

The memory ring 61 comprises stop surfaces 50 that are orthoradial relative to the longitudinal axis X11, which, in the present example, extend in a same orthoradial plane parallel to the orthoradial plane of FIG. 9. In other words, the two stop surfaces 50 are perpendicular to the radial axis R11. The stop surfaces 50 are formed by the half-crown 68.

The indexing tongue 67 is introduced into the longitudinal indexing slot 47, which guides the sliding of the bolt 41 along the radial axis R11 and prevents the rotation of the bolt 41 and the memory ring 61 relative to one another around the longitudinal axis X11.

The half-crown 68 is engaged in the opening 44.

The female coupling element 11 comprises an annular fitting ring 81, preferably coaxial with the longitudinal axis X11, which is housed radially between the plunger ring 51 and the intermediate body 23. For example, the fitting ring 81 slides longitudinally in the intermediate body 23, to that end being guided by the inner radial covering surface 14.

The female coupling element 11 comprises a spring 73, which longitudinally pushes the fitting ring 81 back toward the mouth 25 of the front body 22. The spring 73 is inserted between the intermediate body 23 and a rear face 82 of the fitting ring 81.

The female coupling element 11 comprises a main sealing gasket 31 and defines a main housing 15 for this main sealing gasket 31. The main sealing gasket 31 is for example an O-ring made from ethylene propylene. The main sealing gasket 31 is advantageously coaxial with the longitudinal axis X11 and is mounted in the main housing 15. A front face of the fitting ring 81 forms a rear axial wall 83 of the main housing 15. The rear face of the annular inner ring 63 of the memory ring 61 forms a front axial wall 69 of the main housing 15. The main housing 15 of the main sealing gasket 31 is therefore longitudinally delimited by the memory ring 61 on the one hand and the fitting ring 81 on the other hand. In the uncoupled configuration, the memory ring 61 forms an inner radial wall of the main housing.

The female coupling element 11 is designed to adopt a coupled configuration, shown in FIG. 3, and an uncoupled configuration, shown in FIG. 1. These coupled and uncoupled configurations are specific to the female coupling element 11, irrespective of the position of the male coupling element 2 relative to the female coupling element 11. These coupled and uncoupled configurations reflect a relative position of the different parts of the female coupling element 11, in particular, the female body 21, the main sealing gasket 31, the bolt 41, the plunger ring 51 and the memory ring 61. In FIG. 2, the female coupling element 11 is in an intermediate configuration obtained upon coupling, that is to say, between the uncoupled configuration and the coupled configuration.

As shown in FIGS. 1, 4, 5 and 6, in the uncoupled configuration of the female coupling element 11, the spring 72 pushes the outer ring 62 of the memory ring 61 back toward the front relative to the female body 21, to an advanced position in which the outer ring 62 is abutting in the forward direction against the front body 22.

In the uncoupled configuration of the female coupling element 11, the plunger ring 51 is pushed back in the forward position relative to the female body 21, abutting in the forward direction against the annular inner ring 63 of the memory ring 61.

In the uncoupled configuration of the female coupling element 11, the main sealing gasket 31 is arranged around an outer radial surface 57 at a part with a longitudinally constant outer diameter of the plunger ring 51. The main sealing gasket 31 is stretched around the plunger ring 51. Thus, in the uncoupled configuration, the plunger ring 51 is inserted radially between the front spot facing 55 and the main sealing gasket 31. The main sealing gasket 31 is longitudinally offset, in the forward direction, relative to the intermediate body 23 of the female body 21, while being arranged axially past the front end of the intermediate body 23.

In the uncoupled configuration of the female coupling element 11, each actuating rod 18 is confined in its respective elongate housing 19, between a front end of the elongate housing 19 and a rear surface of the inner groove 65 of the memory ring 61.

In the uncoupled configuration of the female coupling element 11, the stop surfaces 46 of the bolt 41 cooperate in a transverse direction with the stop surfaces 50 of the memory ring 61, while the memory ring 61 is in the advanced position. In other words, in this uncoupled configuration where the memory ring 61 is in the advanced position, the stop surfaces 46 and 50 are at the same level along the longitudinal axis X11 so as to bear transversely in pairs. Thus, the memory ring 61 keeps the bolt 41 in the releasing position in the female body 21, that is to say, a pushed in position, against the action of the two springs 49. In the releasing position, the locking surfaces 45*a* and 45*b* are further from the longitudinal axis X11 along the radial axis R11 than in the holding position so as to allow the movement of the male coupling element 2 in the inner channel 29.

In the uncoupled configuration of the female coupling element 11, the fitting ring 81 is pushed back in the forward direction, in contact with the main sealing gasket 31, by the spring 73. To that end, the spring 73 bears on the intermediate body 23. Preferably, the fitting ring 81 is then radially surrounded by the inclined inner surface 30, while being axially at its level.

To transition the female coupling element 11 from the uncoupled configuration to the coupled configuration, the female coupling element 11 is coupled with the male coupling element 2, as shown in order in FIGS. 1, 2 and 3. As explained below, this coupling is automatic.

As shown in FIG. 1, for this coupling, the front end 4 of the male coupling element 2 is inserted into the mouth 25 of the front body 22 and is engaged in the memory ring 61, then in the front spot facing 55 delimited by the plunger ring 51, while the plunger ring 51 is in the forward position. Once the male coupling element 2 is engaged in the front spot facing 55, the longitudinal axes X2 and X11 become substantially coaxial. The male coupling element 2, moved toward the rear body 24 of the female coupling element 11, then abuts longitudinally against the longitudinal shoulder 56 of the plunger ring 51, as shown in FIG. 2. The plunger ring 51 is inserted radially between the front end 4 of the male coupling element 2 and the main sealing gasket 31, the plunger ring 51 having an interface ring function in order to protect the main sealing gasket 31 from any burrs or abrasive irregularities that may be formed at the front end 4. In other words, in the uncoupled configuration, the plunger ring 51 protects the main sealing gasket 31 with respect to any burrs located at the front end 4 of the male coupling element 2 introduced into the female coupling element 11.

The fitting movement of the male coupling element 2 in the female coupling element 11 continues, the male coupling element 2 thus driving the plunger ring 51 toward the rear of the female coupling element 11, against the action of the spring 71. The female coupling element 11 adopts an intermediate coupling configuration between the coupled configuration and the uncoupled configuration. The plunger ring 51 becomes longitudinally offset relative to the main sealing gasket 31, toward the rear of the male coupling element 2. Through this longitudinal offset of the plunger ring 51, the main sealing gasket 31 is directly radially across from a volume for accommodating the male coupling element 2 in the female coupling element 11. The main sealing gasket 31 radially contracts around the male coupling element 2 and comes into inner radial contact with the outer radial surface 3 and at a distance from the front end 4, toward the rear of the male coupling element 2, the distance from the front end 4 corresponding to the depth of the front spot facing 55 along the longitudinal axis X11. The main sealing gasket 31 thus comes into contact with the male coupling element 2 in an axial location where the risk of abrasive burrs is lower than at the front end 4, which preserves the integrity of the main sealing gasket 31.

As shown in FIG. 2, once the plunger ring 51 is offset across from the main sealing gasket 31, the front collar 52 of the plunger ring 51 comes into longitudinal contact with the actuating balls 18, while the actuating balls 18 abut rearwardly against the inner groove 65 of the memory ring 61. To that end, a longitudinal distance L1, measured parallel to the longitudinal axis X11 in the uncoupled configuration, between the front end 12 of the plunger ring 51 and the front end of the fitting ring 81 forming the rear axial wall 83 of the main housing 15, is less than or equal to a longitudinal distance L2, measured parallel to the longitudinal axis X11 in the uncoupled configuration, between the actuating balls 18, rearwardly abutting against the inner groove 65, and the contact surface 58 of the front collar 52.

The continued fitting movement of the male coupling element 2, which causes the withdrawal of the plunger ring 51 toward the rear of the female body 21, also drives the memory ring 61 rearward relative to the female body 21, by means of the actuating balls 18. Indeed, the withdrawal movement of the plunger ring 51 leads to placing the actuating balls 18 inserted axially between the respective contact surfaces 58 and 70 of the plunger ring 51 and the memory ring 61, such that, upon this placement in contact of the actuating balls 18 with the contact surfaces 58 and 70, the plunger ring 51 becomes axially secured to the memory ring 61 in its movement toward the rear of the female body 21. Thus, the actuating balls 18 form means for transmitting the withdrawal movement of the plunger ring 51 to the memory ring 61, to move the memory ring 61 toward a withdrawn position of the memory ring. In FIG. 3, the memory ring 61 is in the withdrawn position. The actuating balls 18 ensure a transmission of the withdrawal movement of the plunger ring 51 to the memory ring 61 in a small radial bulk and facilitate the assembly of the memory 61 and pushing 51 rings on either side of the intermediate body 23 of the female body 21.

The front collar 52, the elongate housings 19 and the inner groove 65 are configured to impart, to the plunger ring 51, the possibility of longitudinal movement relative to the memory ring 61, from the uncoupled configuration. Thus, from the uncoupled configuration, during the fitting of the male coupling element 2, one obtains a movement sequence according to which the plunger ring 51 is moved first toward the rear, while the memory ring 61 stays in the advanced position, the movement of the memory ring 61 only occurring second.

The movement of the memory ring 61 toward the rear relative to the female body 21 drives the main sealing gasket 31 toward the rear, by means of the front axial wall 69 formed on the annular inner ring 63. The main sealing gasket 31 then comes axially to the level of the inclined inner surface 30, then the inner radial surface 14 so as to be radially surrounded and gripped by the intermediate body 23, which causes a slight radial flattening of the main sealing gasket 31, as it moves toward the rear. The annular inner ring 63 then engages partially in the intermediate body 23. Under the action of the memory ring 61, the main sealing gasket 31 pushes the fitting ring 81 back toward the rear against the spring 73, such that the fitting ring 81 is axially offset toward the rear relative to the inclined inner surface 30. Preferably, the fitting ring 81 is then radially surrounded by the inner radial covering surface 14 over its entire length. The fitting ring 81 accommodates the axial length of the main housing 15 allocated to the main sealing gasket 31 by moving toward the rear, against its spring 73, as is visible by comparing FIGS. 2 and 3. The main housing 15 of the female coupling element 11 is therefore variable both in terms of dimensions and position in the female body 21 between the uncoupled configuration and the coupled configuration of the female coupling element 11. In the coupled configuration, the main sealing gasket 31 provides sealing between the male coupling element 2 and the female body 21 of the female coupling element 11.

Figure 7:
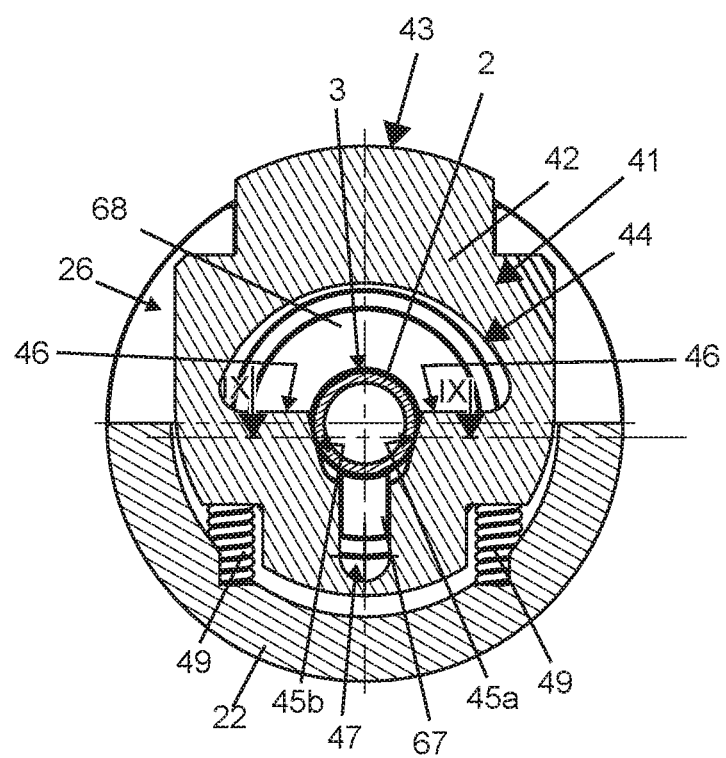
FIGS. 7 and 8 are cross-sections of FIG. 3 along section lines VII-VII and VIII-VIII.

As shown in FIGS. 3 and 7, when the memory ring 61 is offset toward the rear to the withdrawn position under the action of the plunger ring 51, the stop surfaces 50 of the memory ring 61 become offset relative to the stop surfaces 46 of the bolt 41 in the longitudinal direction and the stop surfaces 50 of the memory ring 61, across from the holding surfaces 39 of the bolt 41 in the radial direction R11. The offset of the stop surfaces 46 and 50, obtained in the withdrawn position of the memory ring 61, allows the movement of the bolt 41 toward its holding position, such that the bolt 41 is pushed back by its two springs 49 toward the holding position, that is to say, here, a position that is less pushed in relative to the female body 21. In this withdrawn position, the memory ring 61 thus authorizes the movement of the bolt 41 toward its holding position under the action of the springs 49. In the coupled configuration, the memory ring 61 is in the withdrawn position and the bolt 41 is in the holding position.

The withdrawn position of the memory ring 61 is obtained when the plunger ring 51 is in a rear position relative to the female body 21, parallel to the longitudinal axis X11, as shown in FIG. 3. Thus, the plunger ring 51 in its movement to its rear position drives the memory ring 61 to its withdrawn position. In this rear position, the plunger ring 51 abuts rearwardly against the memory ring 61 by means of the actuating balls 18. In the coupled configuration, the plunger ring 51 is in the rear position.

In the holding position of the bolt 41, the locking surfaces 45a and 45b are in a position cooperating with the male coupling element 2, in particular with its outer radial surface 3. Each locking surface 45a, 45b cooperates locally with the outer radial surface 3. The bolt 41 thus exerts a longitudinal holding of the male coupling element 2 relative to the bolt 41, in the opening 44. Due to their particular orientation described above, the locking surfaces 45a and 45b form a corner for the holding of the male coupling element 2 in the female body 21 both along the radial axis R11 and along the longitudinal axis X11. The locking surfaces 45a and 45b are anchored in the male coupling element 2 in particular when the male coupling element 2 is made from copper or brass.

Figure 8:
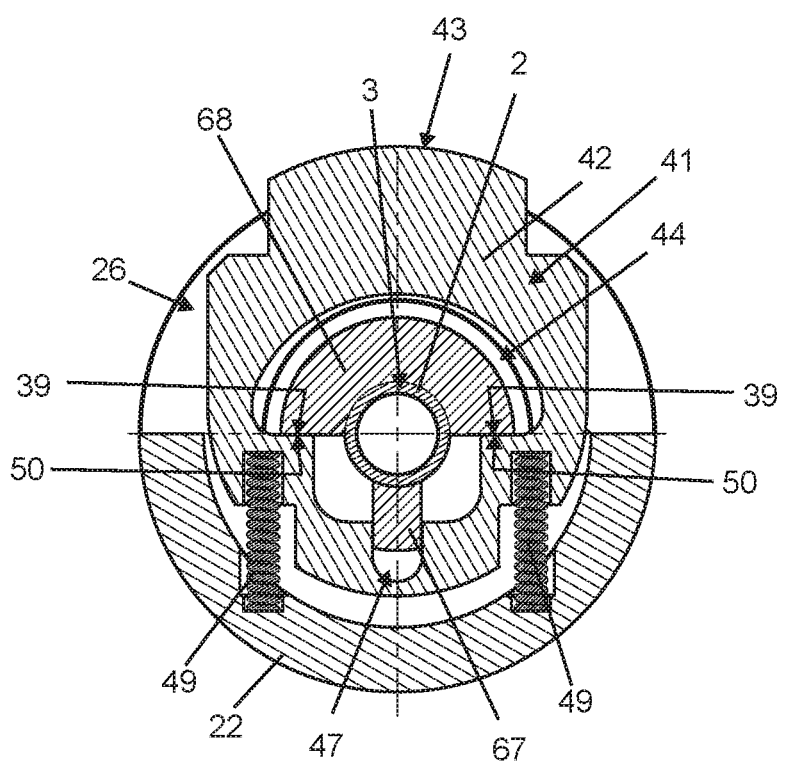

As shown in FIGS. 3 and 8, in this holding position, the two holding surfaces 39 of the bolt 41 are across from stop surfaces 50 of the memory ring 61, in the transverse direction. In the holding position, the holding surfaces 39 of the bolt are transversely at a distance from the stop surfaces 50 of the memory ring 61, the bolt 41 abutting transversely against the male coupling element 2 by means of the locking surfaces 45a, 45b. In the holding position, in the coupled configuration, any radial abutment of the bolt 41 on the memory ring 61 makes it possible to limit the deformation of the male coupling element 2 by the locking surfaces 45a, 45b.

A longitudinal distance L3 is defined, measured along the longitudinal axis X11, which is the distance traveled by the front axial wall 69 relative to the intermediate body 23, for covering of the main sealing gasket 31 by the inner radial covering surface 14 of the female body 21. In other words, it is the longitudinal distance traveled toward the rear by the memory ring 61, in particular by the inner annular ring 63, from the advanced position, until the front axial wall 69 has reached the front end of the inner radial covering surface 14, at the junction between the inner radial covering surface 14 and the inclined inner surface 30. At most, this longitudinal distance L3 can be equal to the distance traveled by the memory ring 61, in particular the inner annular ring 63, between the advanced position and the withdrawn position, relative to the intermediate body 23. This longitudinal distance L3 is preferably equal to a longitudinal distance, measured along the longitudinal axis X11 between the front axial wall 69 of the main housing 15 on the one hand, formed by the memory ring 61, and the front end of the inner radial covering surface 14 of the intermediate body 23 on the other hand, when the female coupling element 11 is in the uncoupled configuration.

A longitudinal distance L4 is defined, measured along the longitudinal axis X11, which is the longitudinal engagement length between the stop surfaces 46 of the bolt 41 and the stop surfaces 50 of the memory ring 61 in the uncoupled configuration. When the memory ring 61 withdraws by the longitudinal distance L4, the bolt 41 goes from a configuration where said bolt 41 is held by the memory ring 61 in its releasing position to a configuration where said bolt 41 is allowed to move toward its holding position.

Between the uncoupled configuration and the coupled configuration, the sealing is guaranteed between the female body 21 and the male coupling element 2 fitted within the female body 21 before or after the locking surfaces 45a and 45b of the bolt 41 cooperate with the male coupling element 2, owing to the fact that the longitudinal distance L3 is smaller than or equal to the longitudinal distance L4.

Throughout all of the axial movement of the plunger ring 51 between the forward position and the rear position, the sealing gaskets 32 and 33 remain radially inserted between the plunger ring 51 and the intermediate body 23.

Once the coupled configuration is reached, the operator can release the male coupling element 2, which is fitted and locked in the female coupling element 11. Once the male coupling element 2 is released, an assembly comprising the memory ring 61, the actuating balls 18, the plunger ring 51 and the male coupling element 2 is pushed back in the forward direction relative to the female body 21, until the bolt 41 abuts in the forward direction against the front body 22. One thus obtains a reacting of the axial play of the bolt 41 in the bolt housing 26 arranged in the female body 21. The locking surfaces 45a and 45b of the bolt 41 are anchored in the outer radial surface 3 of the male coupling element 2 and maintain the male coupling element 2 relative to the bolt 41, therefore relative to the female body 21, along the longitudinal axis X11. In the holding position of the bolt 41, the locking surfaces 45a and 45b of the bolt 41 are brought closer to the longitudinal axis X11, so as to extend partially in the volume accommodating the male coupling element 2 in the female coupling element 11 and to cooperate with the male coupling element 2. The filling of the reservoir can then take place from the channel 99, successively through the part of the inner channel 29 formed by the rear body 24, the plunger 51 and the male coupling element 2, along an arrow F3 shown in FIG. 3.

Definitively, the placement in the coupled configuration is automatic, since the longitudinal insertion movement of the male coupling element 2 in the female body 21 automatically causes the locking of the male coupling element 2 by the bolt 41, by moving the memory ring 61. The coupled position can easily be identified by the operator, visually, since the holding position of the bolt 41, here less pushed in than the releasing position of the bolt 41, is visible from outside the coupling 1.

Furthermore, since the bolt 41, which, in the coupled configuration, ensures the locking of the male coupling element 2, uses radial sliding, the female coupling element 11 defines, from the mouth 25, a volume for accommodating the male coupling element 2 with a reduced longitudinal size, in particular relative to EP 1,916,464. The main sealing gasket 31 moving with the memory ring 61, the longitudinal distance over which the main sealing gasket scrapes the outer radial surface 3 of the male coupling element 2 is therefore relatively reduced.

The use of a plunger assuming the form of the plunger ring 51, sealing on either side of the elongate housings 19 of the female body 21, makes it possible to ensure direct sealing between the female body 21 and the male coupling element 2 by the main sealing gasket 31.

To uncouple the coupling 1, that is to say, to go from the coupled configuration to the uncoupled configuration while the male coupling element 2 is locked by the bolt 41, the operator actuates the bolt 41 so as to transition it from the releasing position against springs 49, that is to say, here, by pressing on the outer face 43. The movement of the bolt 41 against the springs 49 is limited by the abutment of the actuating part 42 of the bolt 41 against the front body 22 along the axis R11. The bolt 41 being in the releasing position, the locking surfaces 45a, 45b have left contact with the male coupling element 2 and have been moved outside the accommodating volume of the male coupling element 2 in the female coupling element 11, such that said male coupling element 2 can be removed from the female coupling element 11, while being moved rearward along the longitudinal axis X11. The plunger ring 51 follows the withdrawal movement of the male coupling element 2 and becomes radially inserted between the main sealing gasket 31 and the longitudinal central axis X11. Preferably, at the front end 12 of the plunger ring 51, the outer radial surface 57 forms an outer stretching surface 59, which has a beveled shape, converging toward the front, in order to stretch the main sealing gasket 31 progressively around the plunger ring 51 during the movement of the plunger ring 51 toward the forward position.

Under the action of the spring 72, the memory ring 61 is pushed back toward the front, until abutting against the female body 21, that is to say, until arriving in the advanced position. Once this position is reached by the memory ring 61, the stop surfaces 50 of the memory ring 61 are across from the stop surfaces 46 of the bolt along the radial axis R11.

When the operator next releases the bolt 41, the bolt 41 is pushed back by the springs 49. The bolt 41 is kept in the releasing position, here the pushed in position, by cooperation of the stop surfaces 46 of the bolt 41 with the stop surfaces 50 of the memory ring 61. The plunger ring 51 is in the forward position and extends near the mouth 25, in an intake volume of the male coupling element 2 in the female body 21, if one wishes to proceed again with a coupling. The uncoupled configuration shown in FIG. 1 is reached. More generally, the female coupling element 11 is ready for another automatic coupling.

To manufacture the female coupling element 11, a method is preferably implemented comprising the following successive steps.
- assembling two bolt springs 49 and the bolt 41 in the front body 22;
- introducing the auxiliary sealing gasket 32 into its groove 16 in the intermediate body 23;
- engaging the plunger ring 51 in the intermediate body 23 by the rear end of the intermediate body 23;
- introducing the fitting ring 81 and the spring 73 between the intermediate body 23 and the plunger ring 51;
- placing the main sealing gasket 31 around the plunger ring 51, while stretching the main sealing gasket 31 around the outer stretching surface 59 of the plunger ring 51;
- after assembling the annular inner ring 63 and the outer ring 62, placing the spring 72 and the memory ring 61 around the intermediate body 23;
- introducing each actuating ball 18 into its respective elongate housing 19, via the assembly orifice 66, by rotating the memory ring 61 relative to the intermediate body 23 around the longitudinal axis X11;
- assembling an assembly, obtained with the preceding steps, in the front body 22, by engaging the indexing tongue 67 in the longitudinal indexing slot 47 of the bolt 41, while keeping the bolt 41 in the releasing position until the memory ring 61 is placed abutting against the front body 22;
- assembling the spring 71 of the plunger ring 51 bearing against the rear collar 53 of the plunger ring 51;
- placing the auxiliary sealing gasket 33 in the groove 17 of the rear body 24;
- screwing the front end of the rear body 24 with the rear end of the front body 22 until the rear body 24 abuts forwardly against the front body 22, the intermediate body 23 being axially sandwiched between the front body 22 and the rear body 24.

In a variant that is not shown, in place of actuating balls 18 interposed between the plunger ring 51 and the memory ring 61, it is possible to provide pins fastened on the memory ring 61 and/or on the plunger ring 51.

In a variant that is not shown, in place of stop surfaces 46 and 50, as well as holding surfaces 39, which here are flat and cooperate with one another in a surface manner in the transverse direction, it is possible to provide periodic or linear cooperation in the transverse direction to obtain the same effects.

In a variant that is not shown, the front axial wall 69 and/or the rear axial wall 83 are inclined relative to a plane orthogonal to the longitudinal axis X11.

A second embodiment of a fluid coupling 101 is shown in FIGS. 13 to 17. This fluid coupling 101 is identical to the fluid coupling 1 shown in FIGS. 1 to 12, except for the differences shown in the figures and described below. The same vocabulary is used for both embodiments. Like features are identified by like reference signs for both embodiments. For the second embodiment, features that are different but perform the same function are identified by a reference sign whose value is increased by 100 relative to the first embodiment.

Figure 13:
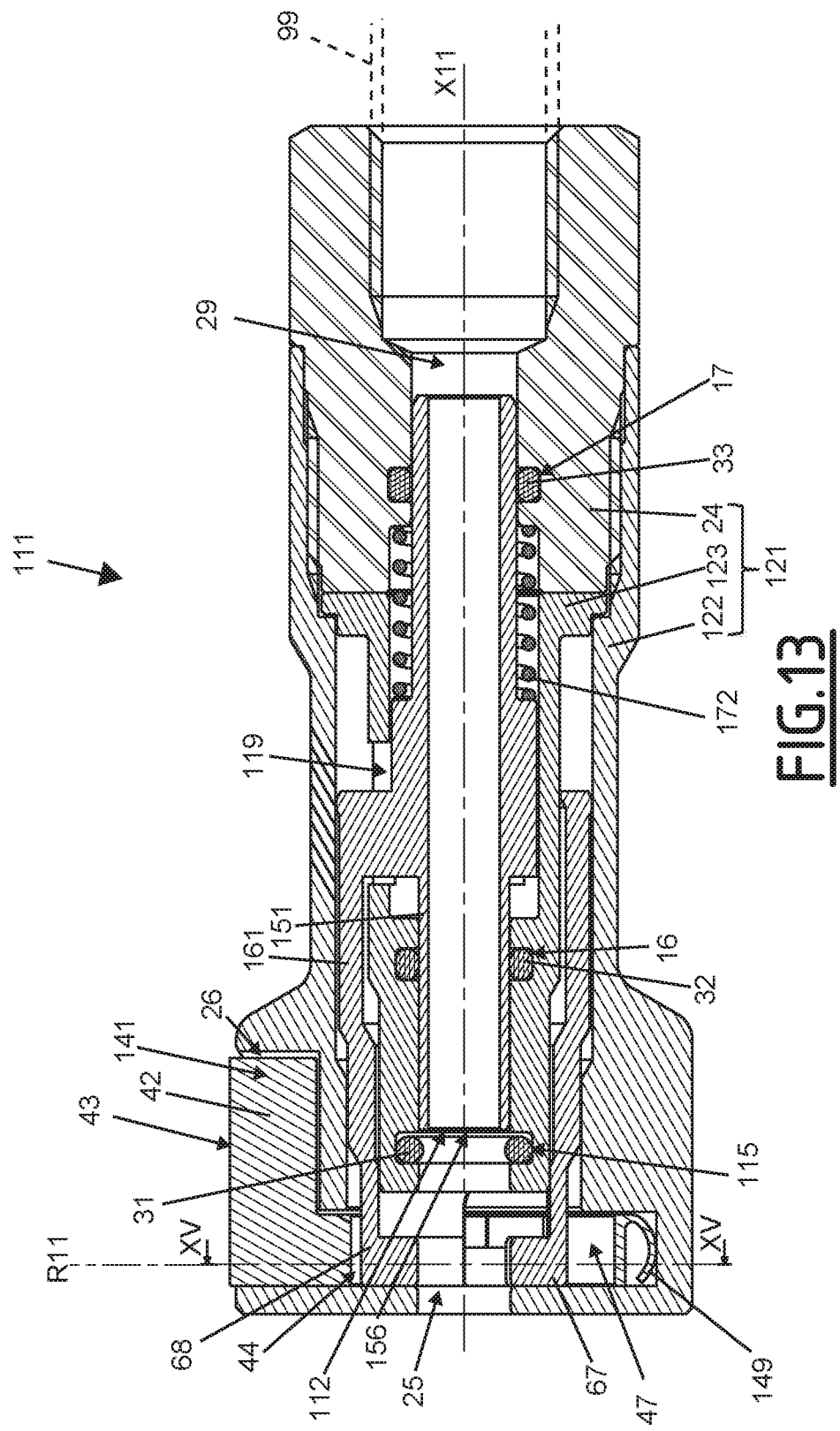
Figure 14:
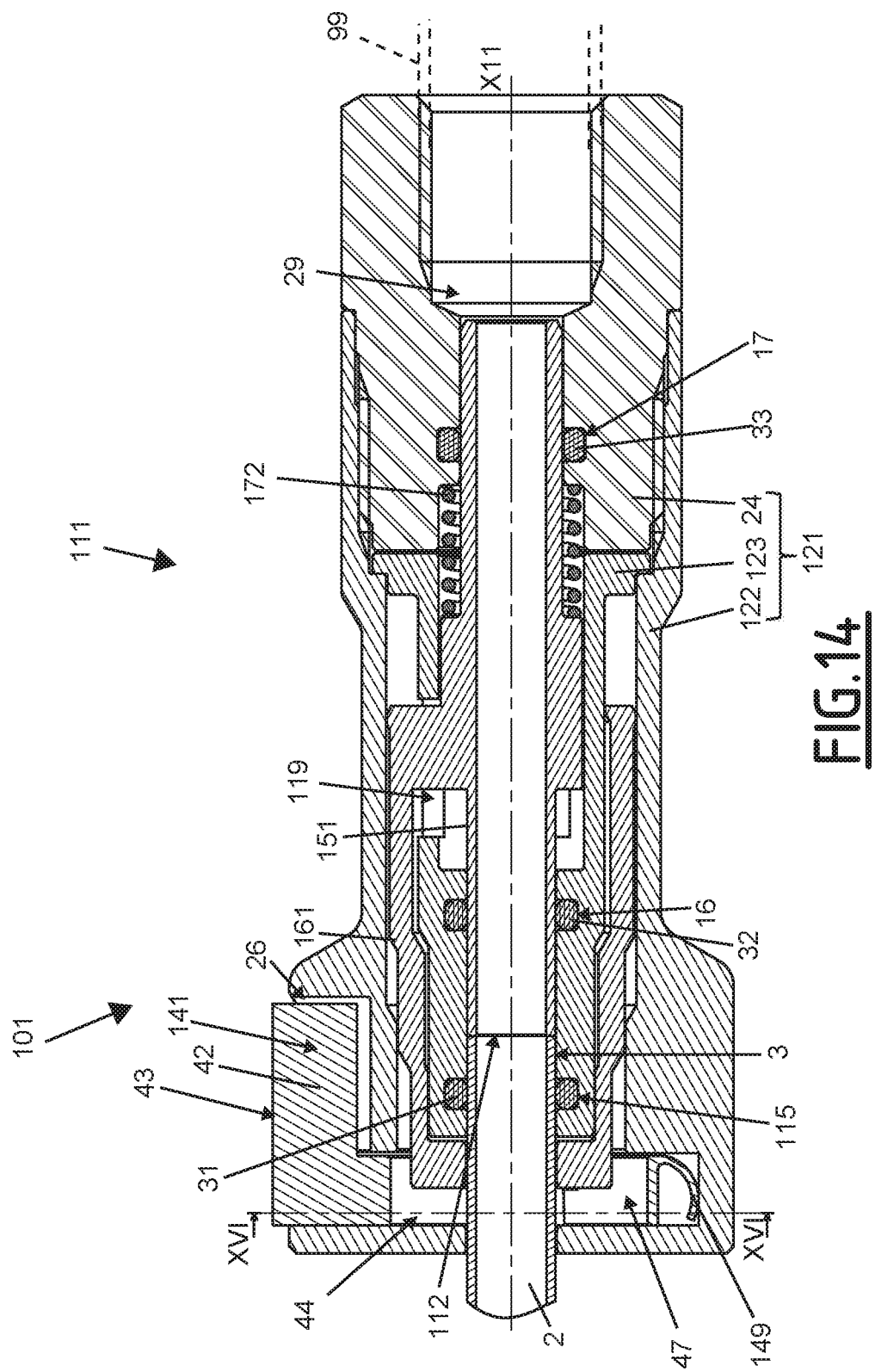
Figure 15:
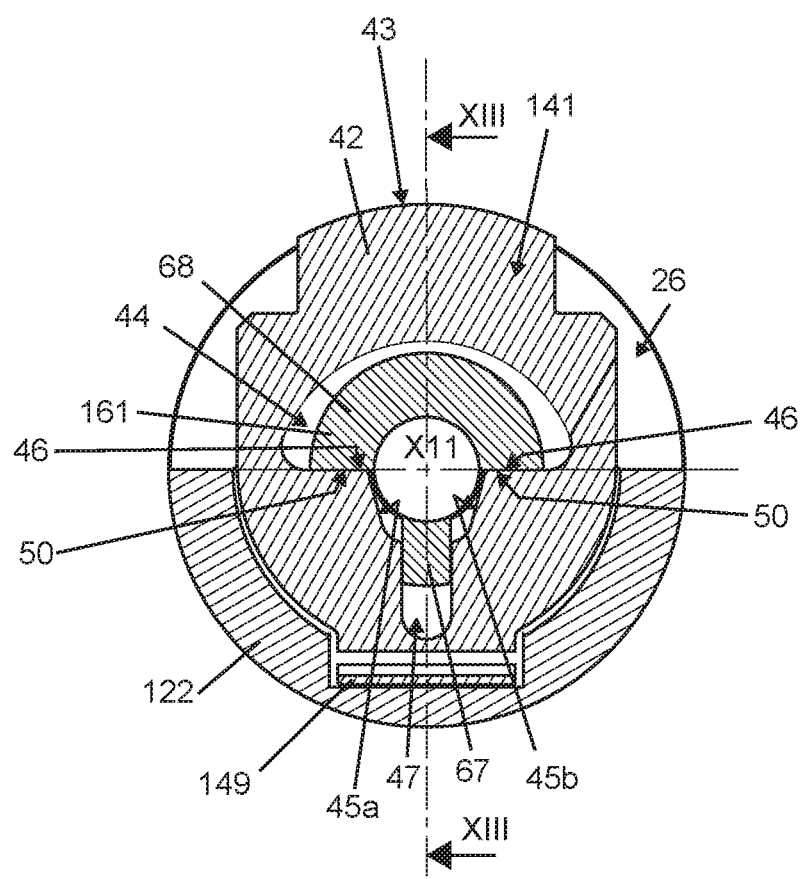
FIG. 15 is a cross-section of FIG. 13 along section line XV-XV, FIG. 15 showing a section line XIII-XIII along which the section of FIG. 13 was done.
Figure 16:
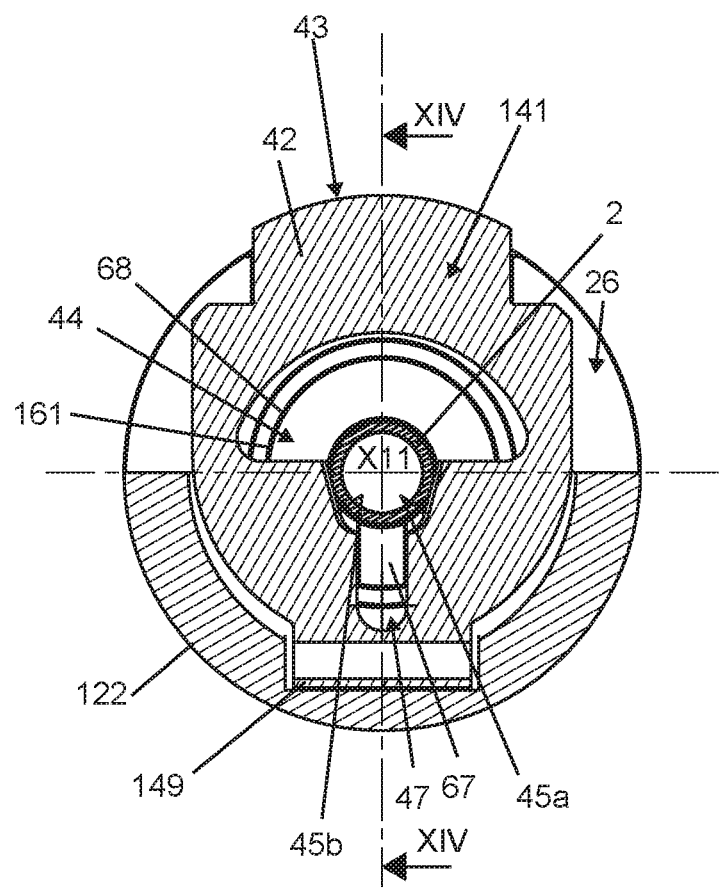
FIG. 16 is a cross-section of FIG. 14 along section line XVI-XVI, FIG. 16 showing a section line XIV-XIV along which the section of FIG. 13 was done.
Figure 17:
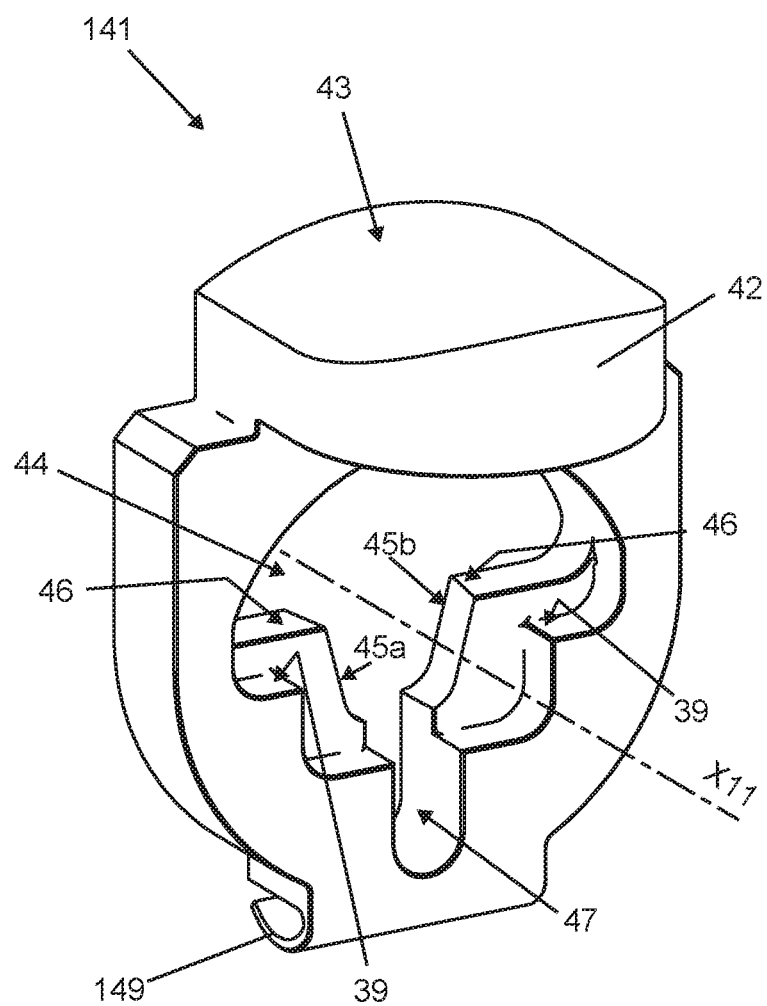
FIG. 17 is a perspective view of a bolt belonging to a female element belonging to the fluid coupling of FIGS. 13 to 16.

As shown in FIGS. 13 and 14, in the fluid coupling 101, in the female coupling element 111, the plunger ring 151 is fixedly secured to the memory ring 161. To that end, the plunger ring 151 and the memory ring 161 have been shown as forming a single-piece part. In a variant, the plunger ring 151 and the memory ring 161 can be fixedly secured, while forming a set of several parts fixedly secured to one another. As shown in FIGS. 13 and 14, a single spring 172 pushes the secured assembly comprising the memory ring 161 and plunger ring 151. The memory ring 161 and the plunger ring 151 are connected by passing radially through the intermediate body 123, at one or several elongate housings 119, arranged radially through said intermediate body 123. The plunger ring 151 therefore does not have a possibility of movement relative to the memory ring 161, along the longitudinal axis X11. In the advanced position of the memory ring 161, the plunger ring 51 is in the forward position; in the withdrawn position of the memory ring 161, the plunger ring 51 is in the rear position.

The longitudinal shoulder 156 of the plunger ring 151, which cooperates with the male coupling element 2 and by which the male coupling element 2 pushes the plunger ring 151 and the memory ring 161 back, is arranged at the front end 112 of the plunger ring 151.

In this second embodiment, the main sealing gasket 31 is housed in a main housing 115 that is arranged in the intermediate body 123 of the female body 121. In this second embodiment, the main housing 115 of the main sealing gasket 31 is therefore stationary relative to the female body 121. In particular, the plunger ring 151 does not play an interface role between the front end 4 of the male coupling element 2 and the main sealing gasket 31.

In this second embodiment, as shown in FIGS. 13 to 17, the bolt 141 is formed in a single piece with the resilient means that push the bolt back in the holding position. Here, the resilient means are formed by a flexible portion 149 of the bolt 141, said flexible portion bearing on the front body 122 belonging to the female body 121.

The memory ring 161 is transversely secured to the female body 121 and movable along the longitudinal axis X11 in the female body 121 between an advanced position, in which the memory ring 161 cooperates with the bolt 141 radially with respect to the longitudinal axis X11, and thus keeps the bolt 141 in the releasing position, and a withdrawn position, in which the memory ring 161 allows the movement of the bolt 141 toward its holding position, the plunger 151 driving the memory ring 161 toward the withdrawn position when the plunger 151 is moved by the male coupling element 2 from the forward position to the rear position during coupling. The spring 172 returns the memory ring 161 toward its advanced position.

Each feature of one of the embodiments and variants described hereinabove can be included, as long as it is technically possible, in any other embodiment or variant described hereinabove.

The invention claimed is:

1. A female fluid coupling element, the female coupling element being designed to adopt a coupled configuration and an uncoupled configuration and comprising:
    a female body, arranging an inner channel able to receive a male coupling element by fitting along the longitudinal axis of the female coupling element;
    a main sealing gasket, able to cooperate radially with the male coupling element in the coupled configuration;
    a bolt, pierced with an opening designed to be passed through by the male coupling element, the bolt being mounted sliding in a bolt housing emerging from the female body, radially with respect to the longitudinal axis, between a holding position, in which the bolt cooperates with an outer radial surface of the male element and opposes the removal of the male coupling element from the female body, and a releasing position, in which the bolt allows the movement of the male coupling element in the female body; in the coupled configuration, the bolt is in the holding position;

resilient means returning the bolt toward its holding position, and a plunger, movable in the inner channel of the female body along the longitudinal axis between a forward position and a rear position, wherein the female coupling element comprises:

a memory ring, secured to the female body radially with respect to the longitudinal axis and movable along the longitudinal axis in the female body, between:

an advanced position, in which the memory ring cooperates with the bolt, radially with respect to the longitudinal axis, and thus keeps the bolt in the releasing position, and a withdrawn position, in which the memory ring allows the movement of the bolt toward its holding position, the plunger being able to drive the memory ring to the withdrawn position when the plunger moves from the forward position to the rear position; and a first spring that returns the memory ring toward its advanced position, and wherein in the uncoupled configuration, the memory ring is in the advanced position.

2. The female coupling element according to claim 1, wherein the bolt and the memory ring comprise respective stop surfaces, which are orthoradial relative to the longitudinal axis, and wherein the stop surface of the memory ring and the stop surface of the bolt:

in the advanced position of the memory ring, are in contact to keep the bolt in the releasing position, and in the withdrawn position of the memory ring, are offset relative to one another along the longitudinal axis to allow the movement of the bolt toward its holding position.

3. The female coupling element according to claim 2, wherein the stop surface of the bolt is delimited by the opening of the bolt.

4. The female coupling element according to claim 2, wherein, in the holding position of the bolt, the stop surface of the memory ring is opposite a holding surface of the bolt, radially relative to the longitudinal axis.

5. The female coupling element according to claim 1, wherein the bolt comprises two locking surfaces, which delimit portions of the opening and which are suitable for cooperating with the male coupling element in the holding position of the bolt, the two locking surfaces are symmetrical relative to a radial plane with respect to the longitudinal axis and the two locking surfaces, are inclined relative to one another and converge opposite the radial mouth of the bolt housing in a section plane orthogonal to the longitudinal axis and passing through the two locking surfaces.

6. The female coupling element according to claim 5, wherein, the two locking surfaces are inclined relative to one another and converge toward the rear of the female coupling element in a section plane orthoradial to the longitudinal axis and passing through the two locking surfaces.

7. The female coupling element according to claim 1, wherein the plunger has a possibility of movement relative to the memory ring, along the longitudinal axis.

8. The female coupling element according to claim 1, wherein:

the memory ring and the plunger are arranged radially on either side of the female body;

the female body comprises an elongate housing, which is a radial through housing, two sealing gaskets arranged on either side of the elongate housing, along the longitudinal axis, are radially inserted between the plunger and the female body, and the female coupling element comprises at least one transmission element, which is arranged in the elongate housing and that is able to cooperate longitudinally with the memory ring and with the plunger, such that the plunger is able to drive the memory ring toward the withdrawn position, by means of the transmission element.

9. The female coupling element according to claim 8, wherein each transmission element comprises an actuating ball.

10. The female coupling element according to claim 1, wherein the plunger:

delimits a front spot facing for receiving a front end of the male coupling element;

in the forward position and in the uncoupled configuration of the female coupling element, is inserted radially between the front spot facing and the main sealing gasket; and is movable along the longitudinal axis relative to the female body, against a second spring of the female coupling element, up to a position in which the plunger is longitudinally offset relative to the main sealing gasket.

11. The female coupling element according to claim 1, wherein:

the female coupling element comprises a main housing housing the main sealing gasket;

the female body comprises an intermediate body around which the memory ring is assembled; and the memory ring forms a front axial wall of the main housing.

12. The female coupling element according to claim 11, wherein:

in the uncoupled configuration, the main sealing gasket is longitudinally offset relative to the intermediate body; and in the coupled configuration, an inner radial covering surface of the intermediate body radially covers the main sealing gasket.

13. The female coupling element according to claim 11, wherein the female coupling element further comprises an adjusting ring housed in the intermediate body and forming a rear axial wall of the main housing of the main sealing gasket in the female element, the adjusting ring being movable relative to the intermediate body along the longitudinal axis and being pushed back by a third spring toward the main sealing gasket.

14. The female coupling element according to claim 1, wherein the memory ring comprises an indexing tongue, which is engaged in a longitudinal indexing slot of the bolt, to connect the memory ring and the bolt in rotation around the longitudinal axis.

15. A fluid coupling, comprising a male coupling element, as well as the female coupling element according to claim 1, the male coupling element being able to abut longitudinally against the plunger and to push the plunger back from its forward position to its rear position, the bolt cooperating, in the holding position, with the outer radial surface of the male coupling element to oppose the removal of the male coupling element from the female body, the outer radial surface of the male coupling element having a longitudinally constant diameter over its entire longitudinal part fitted in the female coupling element in the coupled configuration.

* * * * *